United States Patent [19]

Aneja et al.

[11] Patent Number: 4,808,262
[45] Date of Patent: Feb. 28, 1989

[54] METHOD FOR DEVOLATILIZING POLYMER SOLUTIONS

[75] Inventors: Viney P. Aneja, Schenectady; John P. Skilbeck, Delmar, both of N.Y.

[73] Assignee: General Electric Company, Schenectady, N.Y.

[21] Appl. No.: 129,812

[22] Filed: Dec. 7, 1987

Related U.S. Application Data

[63] Continuation of Ser. No. 808,985, Dec. 16, 1985, abandoned.

[51] Int. Cl.$^4$ .......................... B01D 1/00; B01D 3/06
[52] U.S. Cl. .................................... 159/47.1; 159/2.1;
  159/28.6; 202/177; 203/88; 523/324; 523/340;
  524/481; 524/577; 528/481; 528/501; 165/166
[58] Field of Search ..................... 159/2.1, 47.1, 28.6,
  159/46; 202/177, 205; 203/88, 91; 523/324,
  340; 528/501, 481; 524/577, 481; 165/166, 167,
  164, 47

[56] References Cited

U.S. PATENT DOCUMENTS

| | | | |
|---|---|---|---|
| 2,853,127 | 3/1955 | Sessen | 159/47 |
| 3,004,900 | 10/1961 | Hunt et al. | 202/191 |
| 3,014,702 | 12/1958 | Oldershaw et al. | 257/239 |
| 3,280,899 | 10/1966 | Brasie | 165/109 |
| 3,311,676 | 3/1967 | Toekes | 260/880 |
| 3,453,184 | 1/1969 | Gemassmer et al. | 203/88 |
| 3,735,793 | 5/1973 | Burberry | 159/28.6 |
| 3,865,672 | 2/1975 | Metzinger et al. | 159/47.1 |
| 3,928,300 | 12/1975 | Hagberg | 159/2.1 |
| 4,153,501 | 5/1979 | Fink et al. | 528/501 X |
| 4,294,652 | 10/1981 | Newman | 159/2.1 |
| 4,421,162 | 12/1983 | Tollar | 165/140 |
| 4,423,767 | 1/1984 | Hay et al. | 165/140 |
| 4,464,247 | 8/1984 | Thacker | 202/134 |

FOREIGN PATENT DOCUMENTS 0077656 10/1982 European Pat. Off.
0150225 12/1983 European Pat. Off.
2341341 2/1977 France.

Primary Examiner—Wilbur Bascomb
Attorney, Agent, or Firm—James Magee, Jr.; James C. Davis, Jr.

[57] ABSTRACT

A method and apparatus for devolatilizing high viscosity polymer solutions are provided wherein high viscosity polymer solutions are heated along a short zone of indirect heat exchange. The residence time within the zone of indirect heat exchange ranges from approximately 5 seconds to 120 seconds.

13 Claims, 4 Drawing Sheets

METHOD FOR DEVOLATILIZING POLYMER SOLUTIONS

This application is a continuation of application Ser. No. 808,985, filed 12/16/85, now abandoned.

BACKGROUND OF THE INVENTION

The present invention relates to a method and apparatus for removing volatile components from polymer solutions. More particularly, this invention relates to a method for isolating polymers from volatile components within a polymer solution by indirect heat exchange and a unique apparatus which provides such heat exchange.

The removal of volatile components from a polymer solution, often referred to as "devolatilization", is a necessary step in the commercial manufacture of many polymers. In particular, where a polymer is produced from a solution of monomers, it is necessary to remove the solution and unreacted monomers from the final product. For example, about 15% residual monomer and volatiles must be removed from the polymer product in the bulk polymerization of polystyrene. It is noted that polymer solutions containing volatile components may be generated by other procedures as well, such as purification, blending, etc.

A conventional method for isolating polymers from volatile components is by evaporation wherein the polymer solution is heated above the vaporization temperature of the volatile components. There are primarily three classes of processes and apparatuses for removing volatile components from a polymer solution. The apparatus and method utilized is often dependent on the viscosity of the polymer solution. When the viscosity is less than about $10^6$ centipoises, a thin film apparatus is used. In these thin film devices, the polymer solution is heated as it descends along the inner surface of a tube or cylinder. Scrapers rotate within the tube to expose new surfaces of the polymer solution. The volatile components evaporate from the solution as it flows down the inner surface. These thin film devices have a high initial cost and are costly to operate. To obtain a high output, very large devices and great expenditures of mechanical energy are required. In addition, these devices impart mechanical shear to the polymer and in some cases may cause deterioration of physical properties.

Where the polymer solution is of a viscosity greater than about $10^6$ centipoises, devolatilization may be achieved with the use of vented extruders. These extruders are costly to operate and have a high initial cost per unit of output.

Methods and devices which heat the polymer solution within a zone of indirect heat exchange have been disclosed and are often independent of the viscosity of the polymer solution. However, these processes and devices suffer disadvantages and limitations. Often polymer solutions are subjected to high temperatures for prolonged periods of time. Such exposure causes thermal degradation of heat sensitive thermoplastics such as styrene polymers, including copolymers and mixtures thereof. This thermal degradation often results in discoloration and/or loss of engineering properties, such as impact strength. Those processes and apparatuses which attempt to avoid the degradation of heat sensitive polymers suffer from inefficiency and low output. Typically the polymer is subjected to mild temperatures and a long residence time within the zone of indirect heat exchange. Where this occurs, either output suffers due to a low flow rate through the zone of indirect heat exchange or a very large (and expensive) zone of indirect heat exchange is used to provide the necessary devolatilization.

For example, in U.S. Pat. No. 4,153,501 Fink et al. discloses a method and apparatus for removing vaporizable constituents from melts of thermoplastics by heating the melts of thermoplastics in a defined and gentle manner within a tubular heat exchanger. Fink attempts to avoid degradation of the polymer melts by heating the polymer gradually. This requires a large zone of indirect heat exchange which adds to the initial cost and operating cost of the process.

Other conventional processes which utilize large zones of indirect heat exchange include those of Gemassmer, described in U.S. Pat. No. 3,453,184, and Sessen, described in U.S. Pat. No. 2,853,127. These processes require a long residence time and high heat inputs within the zone of indirect heat exchange, which result in damage to the product in the form of polymer degradation or copolymerization.

It is an object of the present invention to provide a more efficient process and apparatus for removing volatile components from a polymer solution without causing significant damage to the polymer. This is accomplished by reducing the polymer residence time within the zone of indirect heat exchange. Another object of the present invention is to provide a devolatilization apparatus which is efficient and easily manufactured. Other objects will be apparent from the detailed description herein.

SUMMARY OF THE INVENTION

It has been found that these objects and other objects of this invention can be achieved by:

(a) passing a solution of polymers through a zone of indirect heat exchange which comprises a plurality of channels having a substantially uniform surface to volume ratio in the range of about 4 to 50, a height of about 0.05 to 0.5 inches, and a length of about 0.5 to 12 inches, wherein the solution of polymers are heated under pressure in said channels to a temperature above the vaporization temperature of the volatile components and below the boiling point of the polymers, (b) evaporating at least 25% of the volatile components of said polymer solution upon exiting the zone of indirect heat exchange and (c) separating the evaporated volatile components from the devolatilized polymer solution.

It has been found this process can conveniently be achieved with the apparatus of this invention which comprises a vessel having an inlet for the polymer solution, a vapor outlet for volatile components, an outlet for the devolatilized polymer solution plus a heat exchanger disposed within the vessel.

The heat exchanger comprises a central receiving zone for retaining polymer solution fed from the vessel inlet and a plurality of channels that surround the receiving zone which extend from the receiving zone to the outer periphery of the heat exchanger. These channels provide heat exchange surfaces having a substantially uniform surface to volume ratio falling within the range of about 4 to 50 and a length within the range of about 0.5 to 12 inches. Also included are a means for heating the heat exchange surfaces of the heat exchanger to a temperature above both the vaporization temperature of the volatile components and a means for uniformly feeding the polymer solution into the channels.

DETAILED DESCRIPTION OF THE INVENTION

Figure 1:
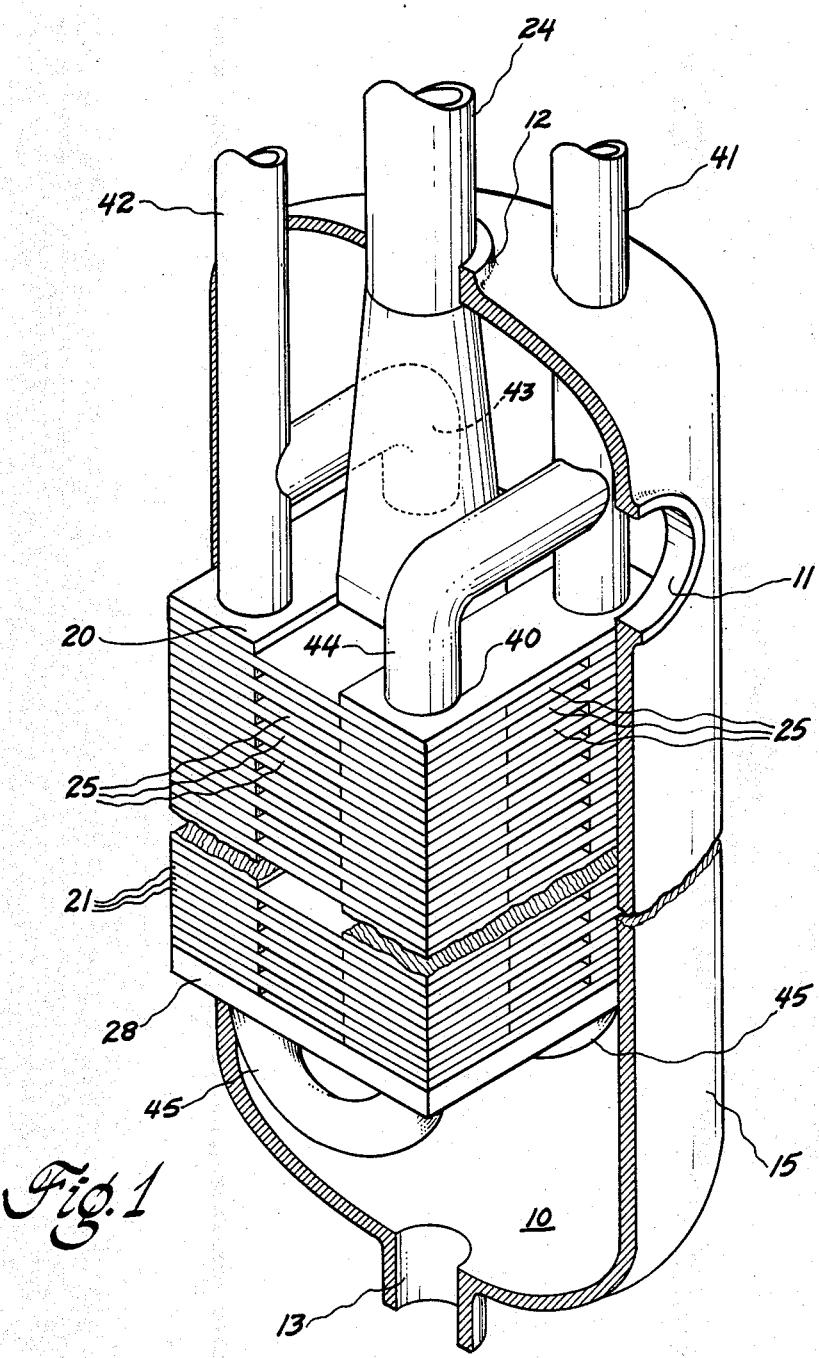
FIG. 1 A sectional view of a devolatilization apparatus of this invention, shown in perspective.

The process of the present invention relates to a method for removing volatile components from a polymer solution. The polymer solutions utilized in this invention are typically highly viscous in that they contain at least 25% by weight polymer. These polymer solutions preferably have a melt viscosity in the range of 100 to 1 million centipoise and most preferably from about 1,000 to 10,000 centipoise, particularly where the polymer solution comprises polystyrene. The polymer solution typically contains over 40 weight percent polymer with 70% to 90% being most common. The remaining portion of these polymer solutions are typically volatile components. These polymer solutions may contain over 99 weight percent polymers; however, it is recognized that the need for devolatilizing the polymer solution decreases at such high concentrations of polymer. The process and apparatus of this invention can be operated so as to completely remove sustantially all of these volatile components or only a partial isolation can be achieved. Polymer solutions can be devolatilized to less than 0.5% by weight volatile components.

The polymers which can be treated by the process of this invention include thermoplastic polymers, silicone polymers, elastomers and high molecular weight lubricants. The term "polymer" as used herein refers to natural and synthetic compounds which have a molecular weight above about 200, preferably within the range of about 10,000 to 50,000 and a degree of polymerization which ranges from dimers to above 10,000. The synthetic compounds can be obtained by homopolymerization or copolymerization, by condensation reactions or addition reactions.

The term "thermoplastic polymers" as used herein refer to polymers which become plastic and flowable under the action of pressure and heat. Examples of such thermoplastics include polystyrene, polypropylene, polyphenylene ethers, polycarbonates, polyvinylchlorides, polyurethanes, polyetherimides, polyamides, polyesters, and the like including copolymers and blends thereof.

Examples of silicone polymers which may be treated by this process include the diorganopolysiloxanes of the formula

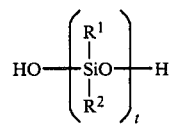

wherein t is a whole number greater than 20 and both $R^1$ and $R^2$ are monovalent hydrocarbon radicals such as methyl, ethyl, propyl, vinyl, ally, cyclohexyl, cycloheptyl, phenyl, methylphenyl, ethylphenyl, etc.

High viscosity lubricants may also be devolatilized by the process and apparatus of this invention and are considered to be within the scope of the term "polymer", as used herein. Such lubricants include high molecular weight hydrocarbon distillates having boiling points in the range of 370°–550° C. These lubricants include n-paraffins, isoparaffins, cycloparaffins, including those which additionally contain aromatic and alicyclic structures.

The term "polymer", as used herein, also includes elastomers such as synthetic diene rubbers such as polybutadiene, polyisoprene, butyl rubbers, polyisobutylene, ethylene-propylene rubbers and ethylene-propylene-diene rubbers (EPDM). Other elastomers which may be treated by the process of this invention include the homopolymers of vinyl ethers, acrylate esters, methylacrylate esters, and acrylonitriles, and copolymers of styrene acrylonitrile (ASA), acrylonitrile/butadiene/styrene (ABS) and butadiene acrylonitrile.

The polymer solutions treated by this invention may comprise mixtures of such polymers with additives and fillers mixed therein. The polymer solutions are typically obtained from the syntheses reactions of the polmers. These product polymer solutions contain monomers or mixtures of monomers and solvents, particularly where polymerization takes place in solution.

According to the method of this invention, the polymer solution is passed through a zone of indirect heat exchange. The term "zone of indirect heat exchange" refers to a system wherein heat is provided to a material from a heat source through a transferring medium. The heat source is typically a high temperature fluid such as oil which heats the transferring medium. The transferring medium is a solid and is most typically metal, such as stainless steel. This transferring medium is configured as a heat exchanger with heat exchange surfaces. The heat exchange surfaces of this medium transfer heat from the high temperature fluid to the polymer solution, heating the polymer solution indirectly.

The polymer solution is heated to a temperature above the vaporization temperature of the volatile components to ensure evaporation of these components. This temperature is also preferably above the glass transition temperature (Tg) of the polymers in solution. This is desirable so as to ensure that the polymers continue to flow and do not clog the zone of indirect heat exchange. For polymers which have high Tg values, such as polyetherimides and polyimides, operation at temperatures above Tg can be avoided by removing only a portion of the volatiles in solution. The residual solvent reduces the viscosity and permits the polymer to flow. The temperature limit is the boiling point of the polymers within solution. Such a temperature would not only cause loss of polymers through vaporization, a significant quantity of polymer would degrade. It is preferable to maintain the temperature at least 10 to 15 degrees below the boiling point of the polymers in solution to avoid degradation. The preferred temperature range is that of about 5° to 50° C. above the glass transition temperature of the polymers. At temperatures within this range, the polymers exhibit a relatively low viscosity which permits high throughputs through the zone of indirect heat exchange. The lower devolatilization temperatures within this range are most preferred. The devolatilization temperatures typically range from about 100° C. to 400° C. and preferably about 150°–350° C. Although temperatures above 350° C. can be used, significant degradation may result for some polymers. Operating at temperatures below 150° C. provides limited devolatilization. For polystyrene, preferable temperatures range from about 160° C. to about 300° C., with 185° C.–275° C. being most preferred. For polyphenylene ethers, preferable temperatures range from about 220° to 270° C. For polyetherimides, preferable temperatures range from about 275° C. to 350° C. The preferred temperature for these and other polymers being determined by their glass transition temperatures.

A pressure is applied to the polymer solution within the zone of indirect heat exchange to reduce vaporization of the volatile components within the zone. Where the volatile components vaporize, a two phase mixture forms comprising a concentrated polymer solution and vapor bubbles of the volatile components. Forming this two phase mixture reduces the efficiency of heat transfer to the polymer solution in that the vapor bubbles separate the polymer solution from the heat exchange surfaces. Pressures within the range of about 2 to 200 atmospheres are suitable. Pressures both above and below this range can be used but detract from the efficiency of the process. It is undesirable to maintain the pressure within the zone of indirect heat exchange below the saturation pressure of the volatile components at the selected devolatilization temperature since such a pressure encourages evaporation. Preferably, vaporization within this zone is eliminated.

A key feature of this invention is the short period of time necessary to perform the process. The polymer solution typically exhibits a residence time of about 0.5 to 10 minutes within the equipment utilized to perform this process. Residence times for the polymer solution of less than two minutes are common. Shorter residence times are peferred and time periods of less than one minute can be achieved quite easily with the apparatus of this invention. The residence time of the polymer solution within the channels which comprise the zone of indirect heat exchange is significantly shorter than the overall residence time for this process. The polymer solution flows through the channels within the zone of indirect heat exchange in about 5 to 120 seconds. The actual residence time depends on the polymers within solution, the concentration of volatile components and the degree of devolatilization desired. Residence times of less than 5 seconds are marginally effective and residence times over 120 seconds are unnecessarily long and can cause degradation of the polymer. A residence time of about 5 to 25 seconds is generally preferred for a 70% solution of polystyrene, with 5 to 10 seconds being most preferred. For a 70% solution of polystyrene and polyphenylene ether, a residence time of about 10 to 50 seconds is preferred.

Polymer degradation within this process is avoided by reducing the time of exposure to the devolatilization temperature for the polymers within solution. This short residence time is obtained by utilizing a short zone of indirect heat exchange wherein the heating takes place rapidly and efficiently. The zone of indirect heat exchange utilized in this process comprises a plurality of channels, each having a length of from about 0.5 to 12 inches. Longer channels can be utilized, but detract from the polymer quality and the efficiency of the process. For example, devolatilization channels as long as 4 to 5 feet may find utility in treating low viscosity solutions. Shorter channels of less than 0.5 inches are only marginally effective. To ensure a rapid and efficient transfer of heat, the zone of indirect heat exchange exhibits a surface to volume ratio within the range of about 4 to 50, the ratio being independent of the units of measurement. Values below 4 will not provide effective heat transfer and values above 50 will require an excessive pressure drop across the zone of indirect heat exchange for the polymer to exit. The higher ratios are preferred for the higher degree of heat transfer provided; with ratios in the range of 5 to 30 being most preferred. These surface to volume ratios prescribe thin channels of indirect heat exchange. The thickness or height of these channels typically range from about 0.05 to 0.5 inches and preferably from about 0.1 to 0.2 inches. This ensures rapid heat transfer to the polymer solution. Channels having a uniform thickness below 0.05 inches are difficult to manufacture and channels greater than 0.5 inches in thickness will not provide adequate heat transfer to all of the polymer which passes through.

The zone of indirect heat exchange comprises a plurality of channels having the dimensions referred to above. A plurality of channels are required to devolatilize large quantities of polymer solution since the channels are thin. Flat planar channels with a rectangular cross sectional area are generally utilized because of the ease of their construction. These channels are of a substantially uniform surface to volume ratio and preferably at a uniform temperature and length so as to devolatilize the polymer solution uniformly. The size and shape of the channels can vary widely. However, to ensure uniform flow through the channels, these values are preferably the same for all channels.

The size and shape of the channels can vary across their length. For example, the channel can increase in width in the direction of flow. Changing the width of the channels across their length may be desirable to control the flow of polymer solution through these zones. Although the size and shape can vary widely, the surface to volume ratio should not fall outside the prescribed range for any given portion of the channel.

To effect rapid heat transfer within the channel, a significant difference in temperature is maintained between the polymer solution and the surfaces of these channels. A temperature difference within the range of about 20° to 100° C. and higher is typical in the performance of this process. These high temperature differences are required to achieve rapid heat exchange. It may be desirable to establish a temperature gradient across the length of the channels in some embodiments. However, due to the short length of the channels, such a temperature gradient is of little advantage. The necessary temperature can be obtained by any conventional means. For example, hot oil or resistance heaters can be used to heat the surfaces of the channels. Where hot oil is used, temperatures in the range of about 100°–350° C. are preferred. Higher temperatures may cause degradation of the oil.

Once the heated polymer solution exits the zone of indirect heat exchange, a major portion of the volatile components are evaporated, typically more than 25%. Evaporation is rapid and the polymer solution foams immediately upon exiting the zone of indirect heat exchange. To achieve evaporation, the pressure is maintained below the saturation pressure of the volatile components for the temperature at which the polymer solution exits the channels. To achieve a high rate of evaporation, this pressure is maintained significantly below the saturation pressure and preferably, the pressure is maintained below 50 atmospheres, and most preferably under a vacuum. The vaporized or evaporated volatile components are then separated from the devolatilized polymer solution. Separation preferably takes place within a vaporization chamber. The polymer solution, being in the liquid phase, is preferably recovered from the bottom of this vaporization chamber while the volatiles are removed from the top. Removal of these two components may be assisted by pumps, blowers, etc.

The method of this invention can easily remove over 90% of the volatile components within a polymer solution to provide a product of less than 1% by weight volatile components. It is preferable to volatilize at least 25% by weight of the volatile components. Particular embodiments of this process will provide polymer solutions of less than 0.5% by weight volatile components, even where the initial polymer solution contains only 80% by weight polymers.

To aid in the volatilization of certain volatile components, a inert volatile may be added to enhance vaporization. These compounds aid in the bubble formation of the volatile components within the polymer solution. The compounds which perform this function vary with the volatiles found within the polymer solution. For example, water may be added to a polymer solution to isolate methylene chloride, toluene, etc. from polymers such as polycarbonate and polystyrene.

The method of this invention is well suited for the devolatilization of polystyrene solutions including high impact polystyrene (polystyrene modified with rubbers) brominated polystyrene and blends of polystyrene, including acrylonitrile/butylene/styrene copolymers, brominated polystyrene and blends of polystyrene, including polystyrene/polyphenylene ether blends. However, as indicated above, the process of this invention is not limited to devolatilizing polystyrene solutions. The preferred residence times for solutions of polystyrene within these channels fall within the range of about 2 to 25 seconds, with 5 to 10 seconds being most preferred. The pressure applied to the polystyrene within the zone of indirect heat exchange preferably ranges from about 2 to 200 atmospheres. Polystyrene solutions can easily be devolatilized to 0.5% by weight volatile components, particularly where the volatile components comprise styrene, toluene, benzene and/or xylene.

The apparatus of this invention is well suited to performing the process described above. Referring to FIG. 1, the apparatus comprises a vessel 15 having an inlet 12 for polymer solution, an outlet 11 for volatile components and a separate outlet 13 for the devolatilized polymer solution. It should be realized that the configuration of vessel 15 and the elements described above can vary widely. For example, one orifice may function as both outlet 13 for the polymer solution and outlet 11 for the volatile components, where properly positioned on the vessel. Separate outlets are preferred, with the outlet 11 being positioned above outlet 13 for polymer solution.

Within the vessel is a heat exchanger 20 of a square configuration with unique capabilities. Other configurations are suitable also. This heat exchanger contains a central receiving zone (not shown in FIG. 1) for retaining polymer solution fed from the vessel inlet. Surrounding the receiving zone are a series of channels 25 which extend from the receiving zone to the outer periphery of the heat exchanger. These channels provide heat exchange surfaces and have a substantially uniform surface to volume ratio and length. Due to the efficiency of the volatilization which occurs, vessel 15 need only be from about 2 to 4 times the height of the heat exchanger.

Heat exchanger 20 shows 56 channels. It should be realized that this number can be conveniently increased or decreased and that the configuration of these channels can vary widely. The dimensions of channels 25 are substantially uniform, which ensures uniformity of exposure to the high temperatures within the channels. The heat exchanger preferably has over 50 channels and most preferably from about 200 to 10,000 channels. For ease of construction, these channels are often planar in configuration and have a rectangular cross sectionalarea along their length. To aid in the uniform feeding of polymer, the channels preferably extend horizontally from the receiving zone. As indicated above, the channel shape and size can vary widely. The channel height preferably ranges from about 0.05 to 0.5 inches with a width preferably ranging from 1 to 4 inches. The channel length ranges from about 0.5 to 12 inches and is preferably 3-6 inches. These preferred ranges are dictated by the extent of heat transfer provided by the channels of such a geometry.

Channeled flow is necessary to provide a high surface to volume ratio. This delivers a high rate of heat exchange and minimizes the duration of exposure to high temperatures. To obtain this channel design, a series of stacked plates 21 can be conveniently used to define both the channel surfaces and the receiving zone for the polymer solution. The channel dimensions are determined by the plate sizes in that the thickness of the channel is equivalent to the thickness of the plates and the length of the channel is equivalent to the width of the plates. Such an apparatus provides easy assembly and disassembly when necessary.

Arranging the channels in a circular configuration permits a larger number of channels to be disposed about the receiving zone. This circular configuration also assists in the uniform feeding of polymer solution to the channels. It should be realized however, the configuration and the arrangement of the plurality of channels can vary widely. Other shapes are possible, including triangular, rectangular, etc.

A very important feature is a means for uniformly feeding the polymer solution into the channels. This feature increases in importance as the number of channels increases. A pump (not shown in FIG. 1) provides the means for uniformly feeding the polymer solution through feed port 24 into the channels of heat exchange 20 shown in FIG. 1. Supporting plate 28 prevents polymer from falling through the bottom of heat exchanger 20. A spacer within the central receiving zone may optionally be used to direct uniform flow into the channels. A spacer is not necessary where the central receiving zone is of a small volume.

For a circular configuration, a cylindrical spacer cenrally disposed about the axis of the heat exchanger or, in the alternative, a conical or frusto-conical spacer can be used. These spacers are used in conjunction with a pump or similar means which transfers the polymer solution to the polymer receiving zone. With the help of these spacers, heat exchangers incorporating a large number of channels can be utilized. This permits high volume throughputs and large product yields from a small compact device.

The heat exchanger incorporates a means for heating the heat exchange surfaces above the vaporization temperature of the volatile components, which can comprise any conventional means known to the art. This includes resistance heaters or a conduit network for transporting heat exchange fluid. Conduit networks are generally preferred in that the temperature can be varied over a wider range. A series of conduits 41, 42, 43 and 44 provide for the flow of heat exchange fluid to the heat exchanger shown in FIG. 1. The apertures 40 provide passages for the flow of heat exchange fluid, which can be fed into the passages directly or through conduits 41, 42, 43 and 44 positioned within these passages. Conduits generally protect against leakage and are often preferred. Due to the high degree of heat exchange required of the heat exchanger, the number of conduits through the heat exchanger preferably ranges from about 40 to 100, although as few as 4 are suitable. These conduits typically run through the heat exchangers in a direction perpendicular to the flow of the polymer solution. Conduits 45 permit the reversal of flow for the heat exchange fluid in the device shown in FIG. 1. However, it should be realized that the configuration of these conduits can vary widely. For example, the number of conduits, the shape of the conduits, the outlets for heat exchange fluid, and the inlets for heat exchange fluid can all be altered. The heat exchange fluid preferably provides a temperature within the range of about 100° to 350° C. within the heat exchanger. Such fluids are typically oils which are free flowing and exhibit high vaporization temperatures.

Figure 2:
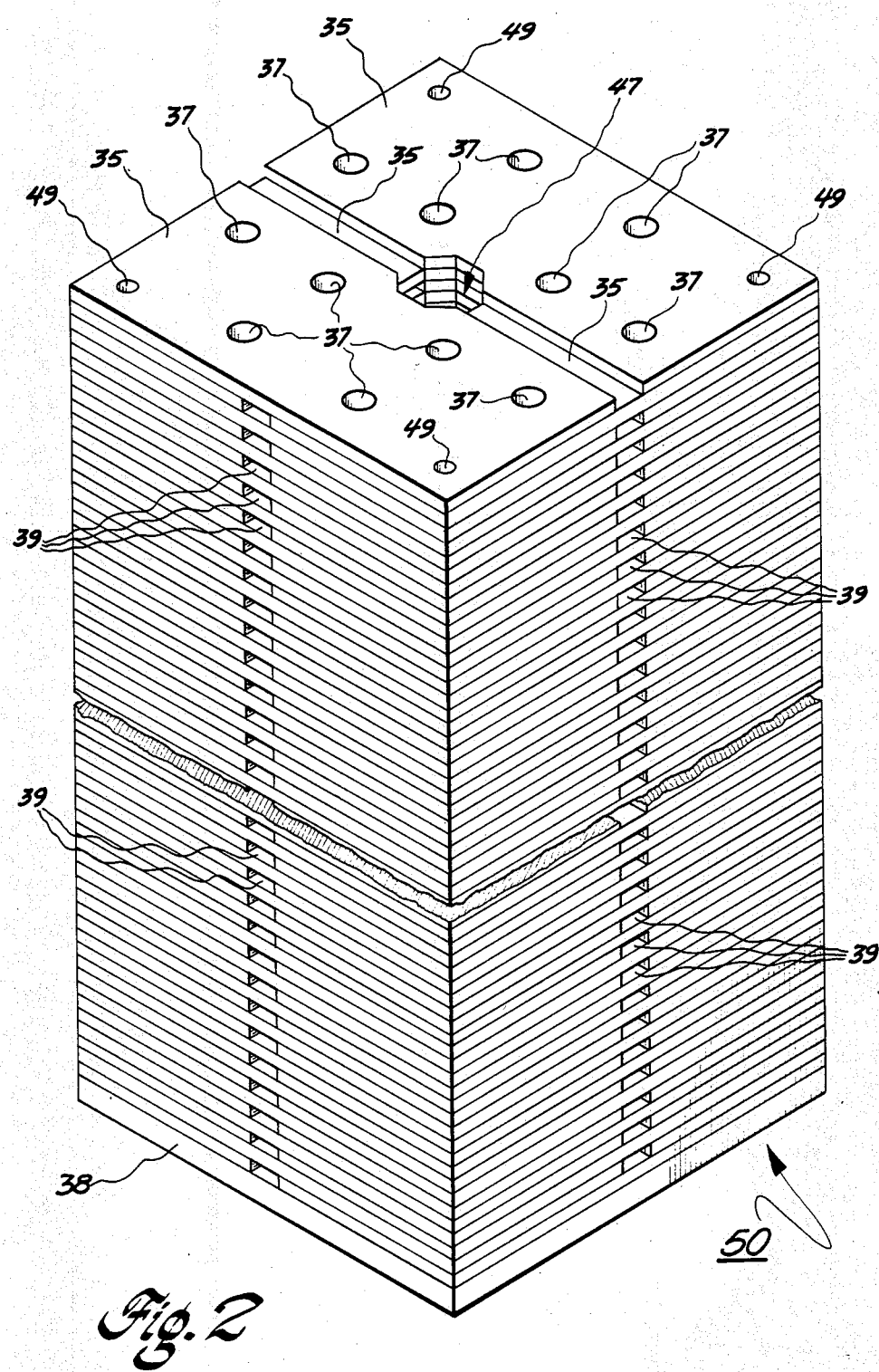
FIG. 2 A perspective view of a heat exchanger utilized in the devolatilization apparatus of this invention.

FIG. 2 illustrates a heat exchanger 50 of a square configuration utilized in the apparatus of this invention. It comprises a series of stacked plates 35 which define central receiving zone 47 and channels 39. Bottom plate 38 caps off the bottom of the central receiving zone 47 to permit the polymer solution to flow through the channels 39. The number of apertures 37 which form passages for heat exchange fluid is increased from 4 to 12 in this embodiment. Apertures 49 provide passages for fastening means through the plates. The number of plates used in heat exchanger 50 is not defined by FIG. 2 so as to emphasize that this value may vary widely.

Figure 3:
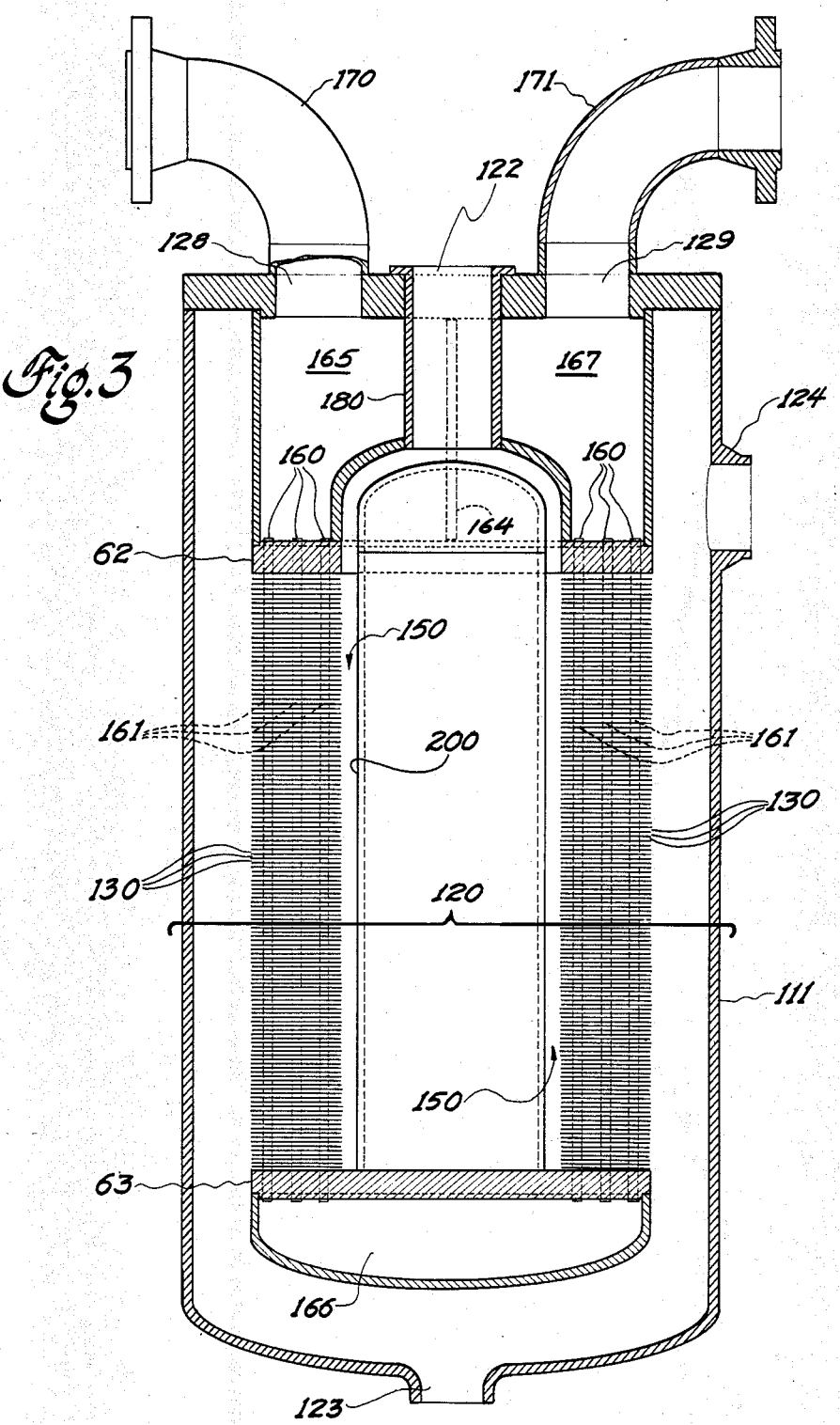
FIG. 3 A side view cross-section of a devolatilization apparatus of this invention, shown schematically.

FIG. 3 illustrates a devolatilization apparatus 120 of the present invention which incorporates a heat exchanger of a cylindrical configuration. Vessel 111 houses the heat exchanger and incorporates an inlet 122 for polymer solution, an outlet 123 for devolatilized polymer solution and an outlet 124 for volatile components. Orifices 128 and 129 provide for the passage of heat exchange fluid to the heat exchanger.

Figure 4:
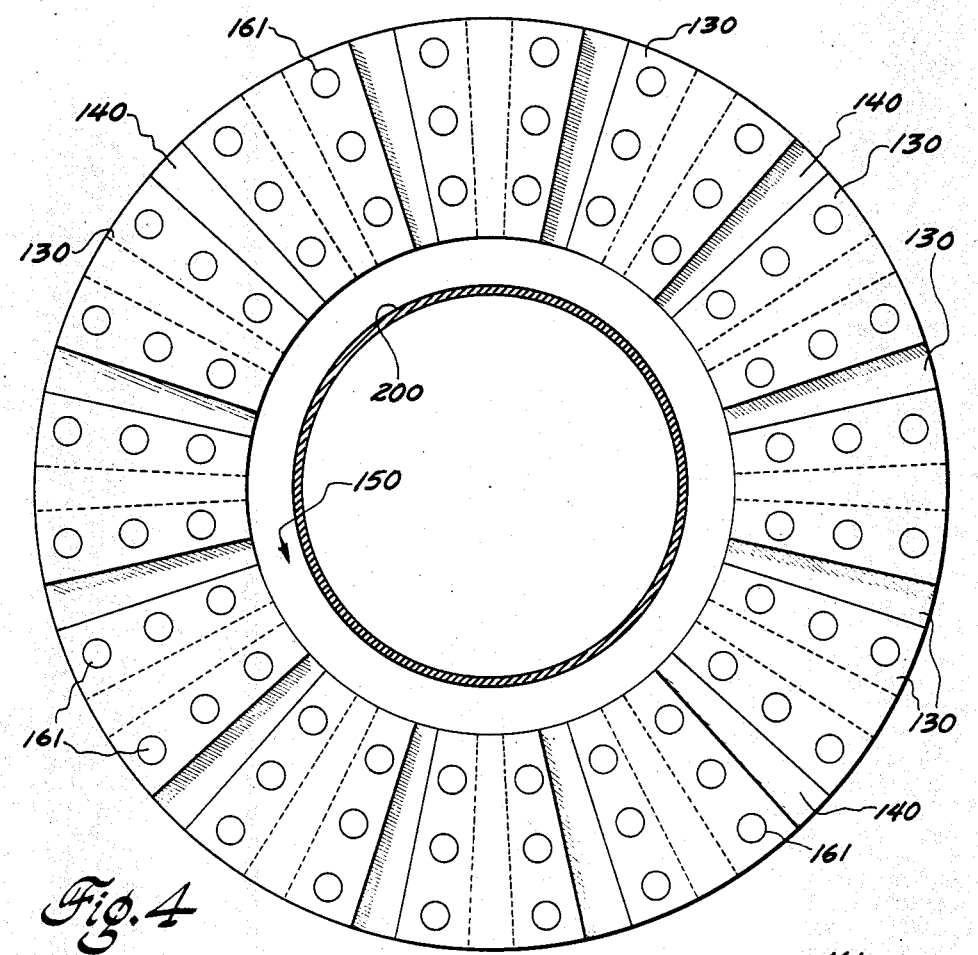
FIG. 4 A top view cross-section of a circular heat exchanger utilized in the devolatilization apparatus of this invention, shown schematically.
Figure 5:
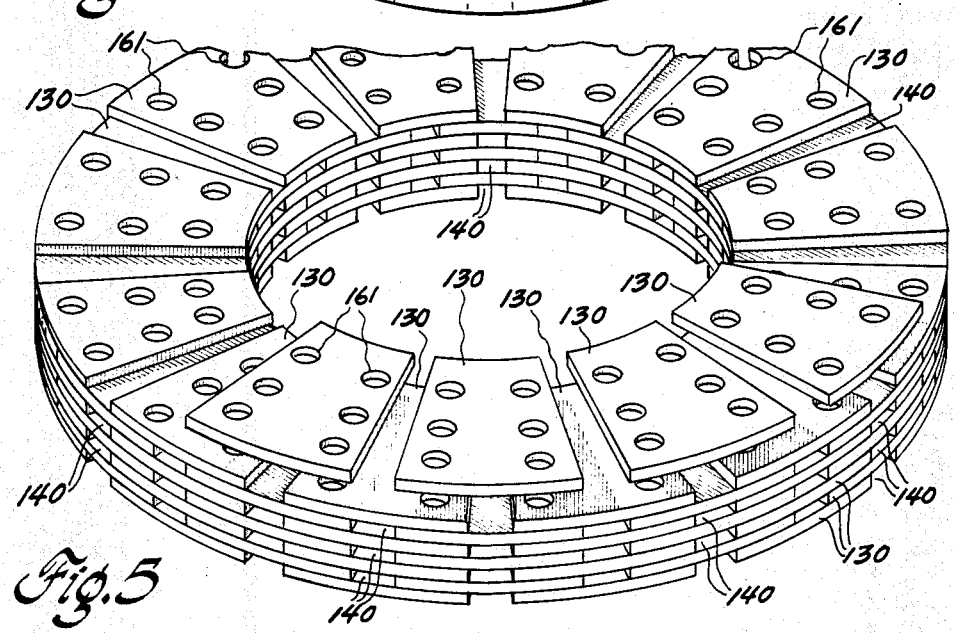
FIG. 5 An exploded view of a circular heat exchanger utilized in the devolatilization apparatus of this invention, shown in perspective.

The heat exchanger is comprised of a series of stacked plates 130 shown in FIG. 3; which define channels 140, shown more particularly in FIGS. 4 and 5, and the central zone 150 for receiving polymer solution. These plates are all of a substantially uniform size so as to provide a substantially uniform surface to volume ratio for the channels. Over 125 layers of plates and channels are shown in the apparatus of FIG. 3 with 12 channels per layer. It should be realized that the number of channels and the configuration can vary widely as discussed above.

The means for heating the heat exchange surfaces to the devolatilization temperature comprises a series of conduits 160 which provide flow for heat transfer fluid. These conduits pass through apertures 161 within the plates also shown in FIGS. 4 and 5. FIG. 3 shows only 6 of the 72 conduits utilized one for each aperture 161, which are disposed as shown in FIGS. 4 and 5. It should be realized that the number of conduits and their configuration can be varied widely. To provide uniform heating, these conduits are uniformly spaced. They are supported by top tube sheet 62 and bottom tube sheet 63. One half of the conduits are fed from manifold 165 and empty to lower manifold 166. The remaining half of conduits are fed from manifold 166 and empty into manifold 167, on the opposing side of manifold 165. Manifolds 165 and 167 are separated by baffle 164. Heat exchange fluid is introduced to the heat exchanger through conduit 170 to manifold 165. Heat exchange fluid exits the heat exchanger from manifold 167 through conduit 171. Conduits 170 and 171 are connected to an external system for handling the heat exchange fluid. The means for uniformly feeding the polymer solution into the channels comprises a pump (not illustrated) which passes a polymer solution through inlet 122 to feed port 180 of the heat exchanger. Feed port 180 directs the polymer solution to the central receiving zone 150. To aid in the uniform feeding of the polymer solution, a closed end pipe 200 is disposed within the central receiving zone. This pipe is positioned so as to provide a uniform distance from the walls to the channels. As indicated above, the configuration of the feeding means for the polymer solution can vary widely.

The following examples are provided to illustrate embodimens of this invention. It is not intended to limit the scope of this invention to the embodiments described.

EXAMPLE 1

An apparatus having a heat exchanger similar to that shown in FIG. 1 was utilized in this example. The heat exchanger contained 200 channels having dimensions of 1.25"L (length), 1.0"W (width) and 0.125"T (height). The plates were comprised of stainless steel and were of the dimensions 3.5"L (length), 1.25"W (width) and 0.125"T (height). Two holes were drilled in these plates for the passage of ¾" outer diameter conduits. Hot oil of a temperature in the range of 250°–300° C. was passed through these conduits at 1–5 gallons per minute. A vacuum pump with trap was connected to the upper outlet to remove volatile components. A holding tank was utilized below outlet 13 to retain devolatilized polymers which were removed with the aid of a vacuum pump.

A polymer solution stream containing approximately 21% polyphenylene ether, 19% polystyrene, 2% polybutadiene rubber, 4% sytrene and 54% toluene solvent was delivered at a rate of 142 pounds per hour to the apparatus. The initial temperature of the material was about 150° C. The pressure within the vessel was about 1174 Torr. The polymer solution was heated to about 195° C. and the product issued from the heat exchanger as a foam and settled at the bottom of the vessel. About 90 lbs/hour of toluene/styrene was vaporized from the solution and about 52 lbs/hour of devolatilized product was removed.

EXAMPLE 2

An apparatus having a heat exchanger as in FIG. 2 of 150 channels with the dimensions 3.0"L, 1.0"W and 0.125"T, was utilized. The stainless steel plates had the dimensions 7.0"L, 3.0"W and 0.125"T. Hot oil at about 250°-300° C. was passed through the 12 conduits at a rate of 1-5 gallons/minute. Vacuum pumps were used to remove vaporized components and the devolatilized solution from the bottom of the vessel.

A polymer solution of about 41.9% polyphenylene ether, 38.0% polystyrene, 3.9% polybutadiene rubber, 2.6% styrene and 13.6% toluene solvent was delivered at a rate of 59.6 pounds/hour at an initial temperature of 198° C. The vessel was maintained at about 400 Torr during the run. About 9.6 pounds/hour of styrene/toluene were vaporized leaving a foaming product of about 50 lbs/hour to settle at the bottom of the vessel for recovery.

EXAMPLE 3

An apparatus having a heat exchanger as shown in FIG. 2 with 200 channels of the dimensions 1.25"L, 1.0"W and 0.125"T, was utilized in this example. The plates were comprised of stainless steel and exhibited dimensions of 3.5"L, 1.25"W and 0.125"T. Six holes were drilled in the plates having a one inch inner diameter. The holes were configured as shown in FIG. 2 to permit conduits having a one inch outer diameter to pass therethrough. Hot oil having a temperature of from about 280° C. was utilized. The hot oil as pumped through the heat exchanger with the help of a pump, ¼ hp, at a rate of 1-5 gallons per minute. A vacuum pump, with trap was connected to outlet 11 of the vessel to remove volatile components. A pump, Vacorex (produced by LUWA Corporation), was utilized below outlet 13 to remove devolatilized polymer solution.

The process of this invention was performed with this apparatus by pumping into the heat exchanger a polymer solution having about 47.3% polymers comprised of high impact polystyrene, polyphenylene ether and Kronitex 50 triarylphosphate flame retardant (produced by FMC Corp.) and 52.7% volatiles which were comprised of about 97% toluene and about 3% styrene. The polymer solution was fed at a rate of 76.3 lbs/hr at an initial temperature of about 150° C. under a pressure of about 615 Torr. The heat exchanger was maintained at a temperature in the range of about 280° C. to 255° C. by the hot oil. The polystyrene solution which exited the heat exchanger had a temperature of about 200° C. to 210° C. The volatile content of the solution was about 34%. The volatiles were removed from the vessel at a rate of about 21.62 lbs/hr and comprised about 5% styrene and about 95% toluene. The pressure within the vessel was about 509 Torr. The product issued as a foam from the heat exchanger and an output of about 54.68 lbs/hr of devolatilized polymer solution was obtained.

EXAMPLE 4

The product of Example 4 was fed into a heat exchanger of a similar configuration to that shown in FIG. 2. This heat exchanger had 100 channels with the dimensions 6.0"L, 1.0"W and 0.1"T. The plates were comprised of stainless steel and exhibited dimensions of 13.0"L, 6.0"W and 0.1"T. Ten holes were drilled in the plates in a configuration similar to that shown in FIG. 2, two additional holes being positioned along each channel. The holes had an inner diameter of one inch to permit conduits of a similar outer diameter to pass therethrough. Hot oil having a temperature of about 280° C. was pumped into the heat exchanger with the help of a General Electric pump, ¼ hp, at a rate of 1-5 gallons per minute. A vacuum pump with trap was connected to outlet 11 to remove volatile components. A pump, Vacorex, was utilized below outlet 13 to remove devolatilized polymer solution.

The devolatilized product of Example 2 comprised 66% by weight polymers comprised of high impact polystyrene, polyphenylene ether, and Kronitex 50 flame retardant in addition to 34% volatiles which comprised toluene. The polymer solution was fed at a rate of about 54.68 lbs/hr at an initial temperature of about 200° to 210° C. under a pressure of about 50 to 100 psig. The heat exchanger was maintained at a temperature in the range of about 271° to 280° C. The pressure within the vessel was maintained at about 385 Torr. The devolatilized polymer solution which exited the heat exchanger had a temperature of about 240° to 250° C. The volatile content of this solution was less than 1% by weight. The volatiles were removed from the vessel at a rate of about 18.6 lbs/hr and comprised toluene. The product issued as a foam from the heat exchanger at an output of about 36.08 lbs/hr.

EXAMPLE 5

An apparatus having a heat exchanger of a configuration similar to that shown in FIG. 2 was utilized. The heat exchanger contained about 40 channels having dimensions of 6.0"L, 1.0"W and 0.10"T. There were 20 conduits for heat exchange fluid which were spaced as described in Example 5. Hot oil having a temperature of about 250°-300° C. was supplied to these conduits at a rate of 1-5 gallons/minute. Vacuum pumps aided the removal of devolatilized solution and the vaporized components. The pressure within the vessel was maintained at about 425 Torr.

A polymer solution of about 87.1% polystyrene, 4.8% polybutadiene rubber, 1.0% styrene and 7.1% toluene solvent was delivered at a rate of about 55.6 pounds/hour. The polymer solution had an initial temperature of about 199° C. The devolatilized polymer solution which exited the heat exchanger had a temperature of about 231° C. Volatiles were removed at a rate of about 2.4 pounds per hour. The product issued as a foam and settled in the vessel. The output of devolatilized polymer solution was about 53 pounds/hour.

EXAMPLE 6

An apparatus having a heat exchanger of a configuration similar to that shown in FIG. 1 was utilized in this example. The heat exchanger contained about 250 channels having dimensions of 3.0"L, 1.0"W and 0.125"T. The stainless steel plates had the dimensions 7.0"L, 3.0"W and 0.125"T. There were 4 conduits for heat exchange fluid which were positioned as shown in FIG. 1. Hot oil having a temperature of about 325° C. was supplied to these conduits at a rate of about 1-5 gallons/minute. Vacuum pumps aided the removal of devolatilized solution and the vaporized components. The pressure within the vessel was maintained at about 413 Torr.

A polymer solution of about 46% polyetherimide polymer in o-dichlorobenzene was delivered at a rate of about 140 lbs/hour, (64 lbs polyetherimide, 75.6 lbs o-dichlorobenzene) at an initial temperature of about 150° C. The devolatilized polymer solution exited the heat exchanger as a foam and was recovered at a rate of about 66.6 lbs/hour. This devolatilized polymer solution comprised approximately 96% solids.

EXAMPLE 7

An apparatus having a circular heat exchanger as shown in FIG. 3 is utilized in this example. The heat exchanger contains 7,404 channels having dimensions of 6.0"L, 1.0"W at the center and 0.10"±0.009"T. The plates are comprised of stainless steel and exhibit the semi-annular configuration shown in FIG. 5. The plates have a thickness of about 0.10±0.009. The inner diameter of the central receiving zone is 15 inches and the outer diameter is 27. A cylindrical spacer disposed within the central receiving zone has an outer diameter of 12 inches. Hot oil having a temperature of from about 230° to 250° is pumped through the heat exchanger at a rate of about 150–400 gallons/minute. A vacuum pump with trap is connected to outlet 124 of the vessel to remove volatile components. A pump is utilized below outlet 123 to remove devolatilized polymer solution.

The process is performed by pumping into the heat exchanger a polymer solution having about 50% volatiles comprising toluene and styrene and about 50% polymers comprising polyphenylene ethers, polystyrene and Kronitex 50 triarylphosphate flame retardant. The polymer solution is fed at an initial temperature of about 130° to 150° C. at a pressure of about 3.4 to 20.4 atmospheres. The heat exchanger is maintained at a temperature in the range of about 230° to 235° C. by the hot oil. The polystyrene solution which exits the heat exchanger has a temperature of about 180° to 190° C. The pressure within the vessel is about 1345 Torr absolute. The volatile content of the solution is about 30%.

What is claimed is:

1. A method for removing volatile components from a polymer solution comprising at least 25 weight percent polymer, said method comprising:
   (A) uniformly feeding said solution of polymer through a zone of indirect heat exchange which comprises a plurality of channels, each having a substantially uniform surface to volume ratio in the range of about 4 to 50, height of about 0.05 to 0.5 inches, a width of about 1 to 4 inches, and a length of about 0.5 to 12 inches, wherein the polymer solution is heated in said channels to a temperature above the vaporization temperature of said volatile components and below the boiling point of the polymers within the solution, wherein a uniform pressure of about 2 atmospheres to about 200 atmospheres is applied to the polymer solution in each channel during heating, such that vaporization of the volatile components is substantially prevented while said solution is in the channels;
   (B) passing the solution from the heat exchange zone into a vaporization chamber at a pressure at which at least 25% of the volatile components of said polymer solution are vaporized upon exiting the zone of indirect heat exchange; and
   (C) recovering the devolatilized polymer solution.

2. A method as in claim 1 wherein the polymer in solution is selected from the group consisting of polystyrene, polypropylene, polycarbonate, polyphenylene ether, polyetherimide, polyester, polyamide, and blends thereof.

3. A method as in claim 1 wherein the polymer solution is heated within the zone of indirect heat exchange above the glass transition temperature of the polymers in solution.

4. A method as in claim 1 wherein the residence time of the polymer solution within said channels falls within the range of about 5 to 120 seconds.

5. A method as in claim 1 wherein the volatile components are vaporized at a pressure below 50 atmospheres.

6. A method as in claim 5 wherein the volatile components are vaporized under a vacuum.

7. A method as in claim 1 wherein each channel has a surface to volume ratio in the range of 5 to 30, a height of from 0.1 to 0.2 inches, and a length of from 3 to 6 inches.

8. A method as in claim 7 wherein the polymer solution is heated to a temperature in the range of about 150°–350° C.

9. A method as in claim 8 wherein the residence time of the polymer solution within said channels falls within the range of 5 to 10 seconds.

10. A method as in claim 1 wherein the polymer in solution is a polystyrene selected from the group consisting of high impact polystyrene, acrylonitrile-butylene-styrene copolymer, and brominated polystyrene.

11. A method as in claim 10 wherein the solution contains another polymer selected from the group consisting of polyphenylene ether, polycarbonate, polyetherimide, polybutylene terephthalate and polyethylene terephthalate.

12. A method as in claim 11 wherein the polymer solution is comprised of about 10% to 80% polystyrene and about 10% to 40% polyphenylene ether.

13. The method of claim 1 wherein substantially all of the volatile components are removed from the polymer solution.

* * * * *